(12) United States Patent
Anderson et al.

(10) Patent No.: US 7,360,775 B2
(45) Date of Patent: Apr. 22, 2008

(54) SLA INDEPENDENT VEHICLE SUSPENSION WITH AIR BAG SPRINGS

(75) Inventors: Scott V. Anderson, Paw Paw, MI (US); James F. Ziech, Kalamazoo, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 330 days.

(21) Appl. No.: 11/116,489

(22) Filed: Apr. 28, 2005

(65) Prior Publication Data

US 2006/0244233 A1 Nov. 2, 2006

(51) Int. Cl.
*B60G 3/12* (2006.01)
*B60G 3/20* (2006.01)

(52) U.S. Cl. .................. 280/124.128; 280/124.135; 280/124.143

(58) Field of Classification Search ......... 280/124.116, 280/124.125, 124.128, 124.134, 124.135, 280/124.136, 124.143, 124.153, 124.157
See application file for complete search history.

(56) References Cited

U.S. PATENT DOCUMENTS

| | | | |
|---|---|---|---|
| 3,193,302 A * | 7/1965 | Hill ...................... | 280/124.128 |
| 3,630,541 A | 12/1971 | Carlson | |
| 4,556,238 A * | 12/1985 | Matschinsky ........ | 280/124.135 |
| 4,714,270 A | 12/1987 | Rumpel | |
| 4,858,949 A * | 8/1989 | Wallace et al. ....... | 280/124.116 |
| 5,000,477 A * | 3/1991 | Minakawa et al. ... | 280/124.136 |
| 5,071,156 A * | 12/1991 | Kanai et al. ......... | 280/124.143 |
| 5,102,159 A * | 4/1992 | Sato et al. ............... | 280/86.75 |
| 5,427,404 A | 6/1995 | Stephens | |
| 6,357,769 B1 | 3/2002 | Omundson et al. | |
| 6,672,604 B2 * | 1/2004 | Eveley ................ | 280/124.128 |
| 6,733,021 B1 | 5/2004 | Ziech | |
| 6,945,547 B2 * | 9/2005 | Ackley et al. ........ | 280/124.143 |
| 7,108,271 B2 * | 9/2006 | Smith .................. | 280/124.128 |
| 2004/0046349 A1 * | 3/2004 | Ackley et al. ........ | 280/124.135 |
| 2004/0227320 A1 * | 11/2004 | Platner et al. ........ | 280/124.135 |
| 2005/0029770 A1 | 2/2005 | Kim | |

FOREIGN PATENT DOCUMENTS

EP     1396357 A2     3/2004

OTHER PUBLICATIONS

Lotus Ultra-light IRS Design.
Paul Weissler, Light Axle IRS, Automotive Engineering, Jul. 2004, p. 62.

* cited by examiner

*Primary Examiner*—Paul N. Dickson
*Assistant Examiner*—Joseph Rocca
(74) *Attorney, Agent, or Firm*—Marshall & Melhorn, LLC.

(57) ABSTRACT

The present invention relates to an independent rear vehicle suspension that comprises a fore/aft link with first and second ends, where a bracket pivotally supports the first end of the fore/aft link from a vehicle frame member. The fore/aft link has an air bag spring located between the fore/aft link's second end and the frame member. A lateral link pivotally connects between the fore/aft link's second end and the vehicle frame. A wheel upright, with an axle aperture extending through it, is rigidly attached near to the second end of the fore/aft link and located above the fore/aft link. An upper control rod is pivotally connected to the wheel upright and pivotally mounted to the frame member.

12 Claims, 4 Drawing Sheets

SLA INDEPENDENT VEHICLE SUSPENSION WITH AIR BAG SPRINGS

FIELD OF THE INVENTION

The present invention relates to an independent rear vehicle suspension. More particularly, the present invention relates to a short and long arm independent rear vehicle suspension that utilizes air bag springs.

BACKGROUND OF THE INVENTION

Those skilled in the art know that a vehicle has a suspension for supporting the upper part of the vehicle on the vehicle's axles. In some vehicles, a suspension on one side is independent from a suspension on the other side. Also, some suspensions utilize short and long mechanical arms (SLA), and/or air bag springs to provide support for the upper part of the vehicle.

Examples of relevant art involving vehicle suspensions are as follows. U.S. Pat. No. 3,630,541 to Carlson et al. teaches a vehicle axle suspension having a bracket 16 attached to a frame member 12. The bracket has a pivotal connection 18 for supporting a trailing arm 17. The axle is bolted to the trailing arm by two U-bolts. An air spring unit 19 is located between the trailing arm 17 and the frame.

U.S. Pat. No. 4,858,949 to Wallace et al. provides for a trailing arm suspension having a frame bracket assembly 18 attached to a frame member. A trailing arm 16 is pivotally attached to the frame bracket assembly 18. A clamping assembly 28 secures the axle below the trailing arm with a plurality of elongated bolts. An air spring assembly 22 is secured to the rear of the trailing arm between the trailing arm and the frame. A track bar 115 is attached to the frame to resist side-to-side motion. The track bar is not attached to the trailing arm.

However, a vehicle would benefit from a light weight and inexpensive independent rear suspension that utilizes SLA technology with an air bag spring.

SUMMARY OF THE INVENTION

The present invention relates to a vehicle suspension that comprises a fore/aft link having a first end and a second end, a bracket for pivotally supporting the first end of the fore/aft link, from a portion of a vehicle frame, an air bag spring located between the second end of the fore/aft link and the vehicle frame, a lateral link pivotally connected proximate the second end of the fore/aft link and a portion of the vehicle frame, and a wheel upright having an axle aperture extending therethrough above the fore/aft link, rigidly attached proximate the second end of the fore/aft link.

Further advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
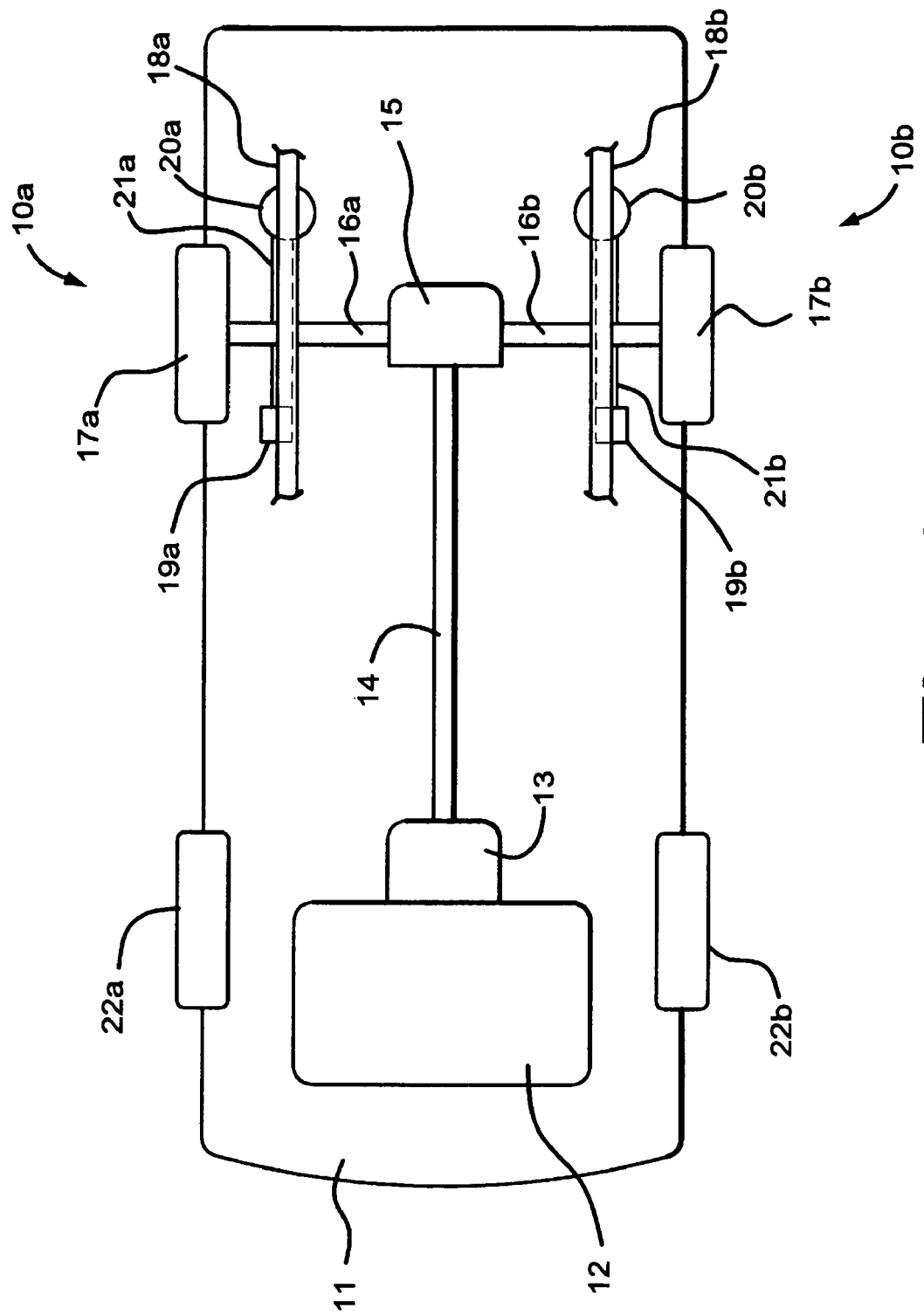
FIG. 1 is a top view of a vehicle in accordance with the present invention.

FIG. 1 illustrates a vehicle 11 having front wheel assemblies 22a, b and an engine 12 that drives a transmission 13, which drives a main drive shaft 14 that is coupled to a rear wheel differential 15. In turn, the rear wheel differential 15 drives left and right half axles 16a, b that, respectively, independently drive left and right rear wheel assemblies 17a, b.

Also shown in FIG. 1 are individual short and long mechanical arms (SLA) rear vehicle suspensions 10a, b (i.e., one for each side of the vehicle 11). The suspensions 10a, b support the rear upper part (not shown) of the vehicle 11 by way of respective frame members 18a, b, where each of the rear suspensions 10a, b is independent of the other suspension 10b, a. Even though shown separately in FIG. 1, the frame members 18a, b may be one frame.

Figure 2:
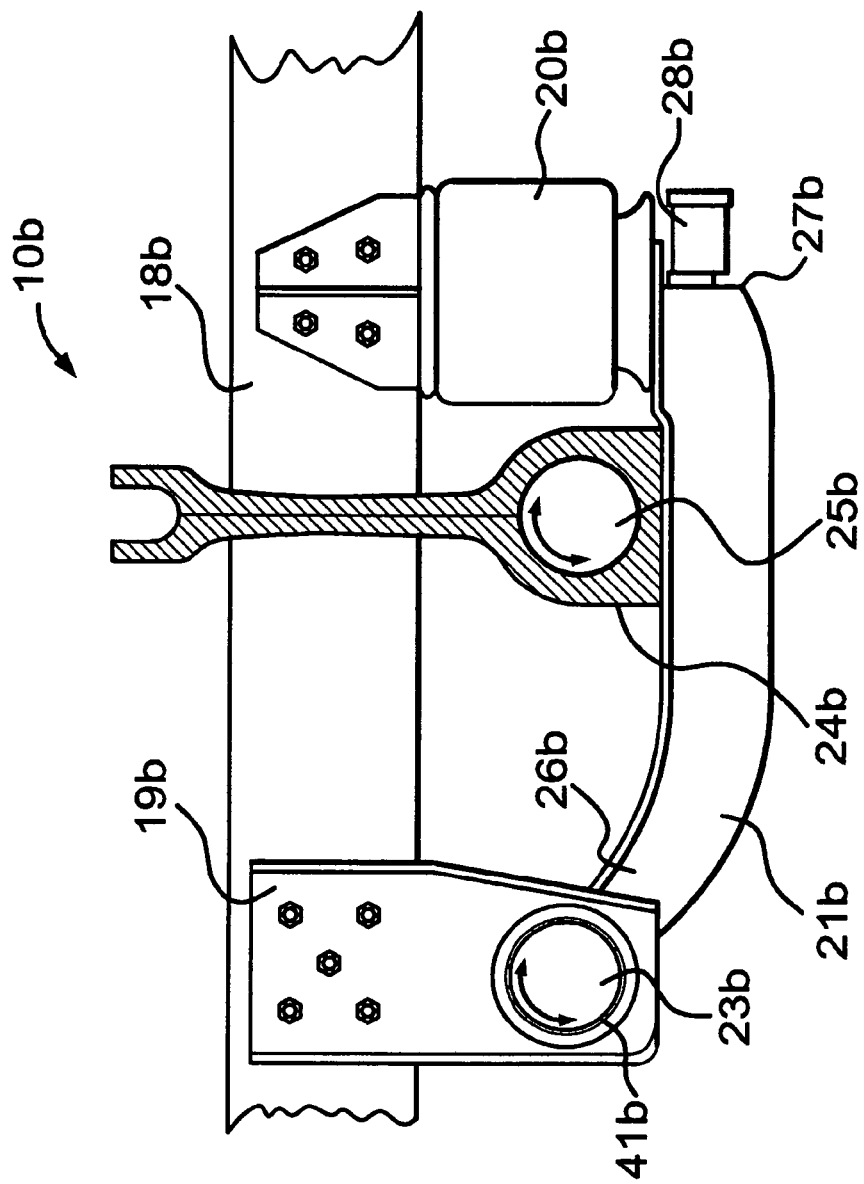
FIG. 2 is a side elevation view of a rear suspension of the vehicle of FIG. 1.
Figure 3:
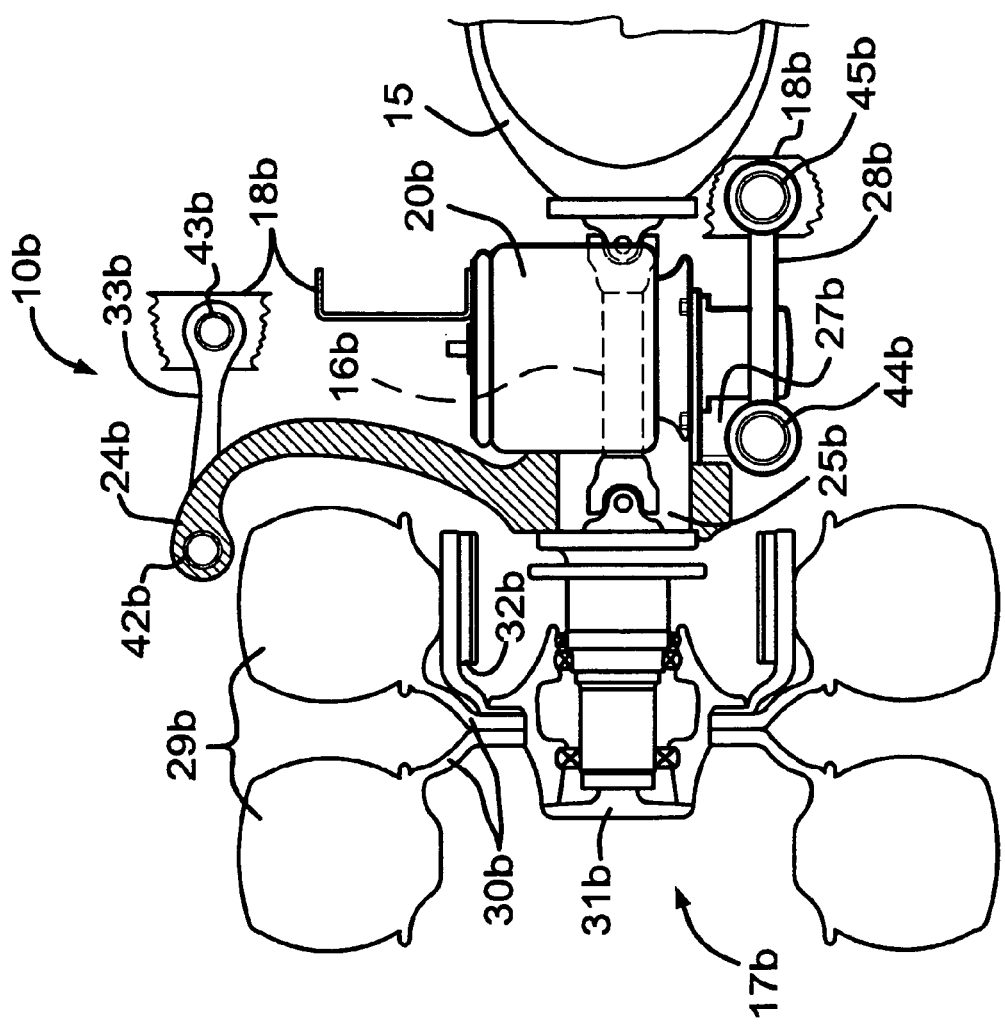
FIG. 3 is a rear view of the vehicle suspension of FIG. 2.
Figure 4:
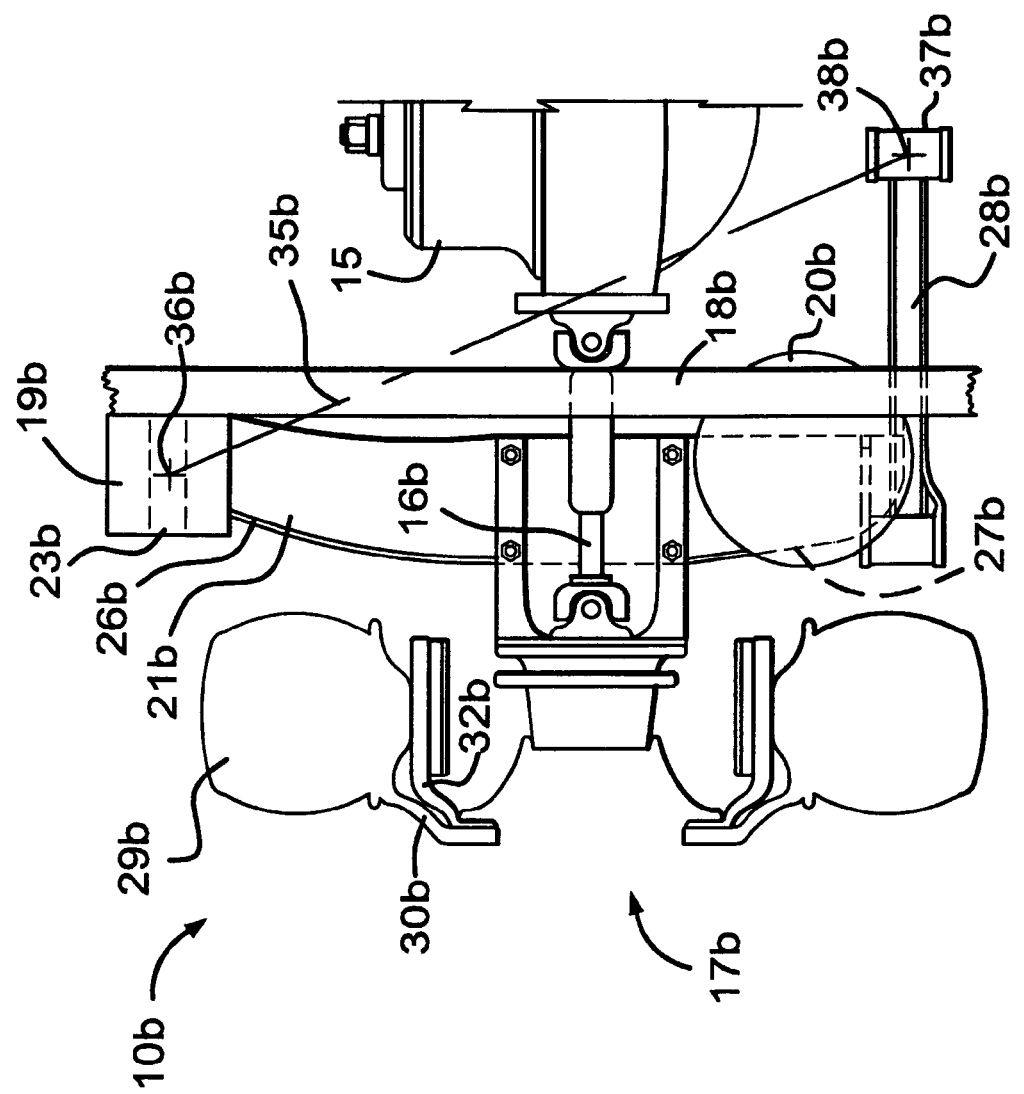
FIG. 4 is a top view of the vehicle suspension of FIG. 2.

Although FIGS. 2-4 illustrate the suspension 10b, the individual rear suspensions 10a, b are essentially the same. Specifically referring to FIG. 2, there is shown a side view of a preferred embodiment of the suspension 10b. A hanger bracket 19b, which has a pivot aperture 23b therethrough, is disposed on a frame member 18b. A fore/aft link 21b is pivotally supported at a first end 26b at the bracket pivot aperture 23b, where a bracket bushing 41b is disposed.

An air bag spring 20b (which may have an internal jounce bumper spring(s) that is not shown) is located between a second end 27b of the fore/aft link 21b and the frame member 18b. Those skilled in the art understand that another type of spring, such as a coil spring, may alternately be utilized. A lateral link 28b is pivotally connected at the second end 27b of the fore/aft link 21b. It is a discovery of the present invention that, in combination, the fore/aft link 21b and the lateral link 28b effectively form a lower control arm, which is known in the art as a long arm. A wheel upright 24b (shown in cross-section) is rigidly attached near the second end 27b of the fore/aft link 21b, where the wheel upright 24b has a second half axle aperture 25b that allows the second half axle 16b to rotate therethrough.

FIG. 3 depicts a rear view of the suspension 10b between the rear wheel differential 15 and the rear wheel assembly 17b. An upper control rod 33b (a short arm that is a simple radius rod, with upper control rod bushings 42b and 43b disposed therein) is pivotally connected to the wheel upright 24b (shown in cross-section) and pivotally mounted to the frame member 18b. Also shown in FIG. 3 is the lateral link 28b connected at the second end 27b of the fore/aft link 21b. The lateral link 28b (with lateral link bushings 44b and 45b disposed therein) is also attached to the frame member 18b. For the sake of clarity, several brackets and cross members needed to mount the suspension and drive mechanisms have been omitted. However, these brackets and cross members would be of standard construction.

The rear wheel differential 15 drives the independent second half axle 16b, which rotates the stub shaft 31b, thereby rotating wheels 30b and tires 29b, and moving the vehicle 11. Also shown is a brake drum 32b that is utilized for slowing and stopping the vehicle 11.

FIG. 4 provides a top view of the suspension 10b. The hanger bracket 19b is shown supporting the first end 26b of the fore/aft link 21b from the frame member 18b. Also shown is the air bag spring 20b located between the second end 27b of the fore/aft link 21b and the frame member 18b, and the lateral link 28b that is connected at the second end 27b of the fore/aft link 21b.

It is a discovery of the instant invention that a lower control arm pivot axis 35b is thereby formed by the combination of the fore/aft link 21b and the lateral link 28b. The pivot axis 35b extends from a center point 36b of the pivot aperture 23b to a center point 38b of a lateral link attachment at the frame member 18b.

As a result of the pivot axes 35, the present invention allows for the fore/aft links 21 to be robust so as to carry large spring loads from the air bag springs 20 (and accompanying jounce bumper springs), and yet at the same time laterally stabilize the suspensions 10a, b with light weight (and less expensive) lateral links 28. Additionally, it is felt that the upper control rods 33 can be of simple, low cost, and light in weight, with the single outboard and inboard bushings 42-43. These control rods 33 would be in contrast to the conventional triangular shaped upper control rods with two inboard bushings.

Further, the lower links (i.e., the fore/aft links 21 and lateral links 28) spread out lower link loads on the frame members 18. The fore/aft links geometry, as shown in FIGS. 2-4, allows the air bag springs 20 a motion ratio that reduces the spring load required from the air bag springs 20. Therefore, a single air bag spring 20 per side (left or right) is utilized. A minimum number (e.g., five per side) of the bushings 41-45 are utilized to connect the wheel uprights 24 and the frame members 18 to the suspension links 21, 28, 33.

The frame loading in the present invention is similar to traditional suspension frame loading, however, good lateral stability is obtained with the use of the lateral links 28. Good braking and drive torque reaction are obtained with the long distance pivot axes 35.

Thus, the fore/aft links 21 and the lateral links 28 allow a beneficial motion ratio for the air bag springs 20 and shock absorbers (not shown), allow a wide based frame member load distribution, and allow a cost effective construction. The outer bushing attachments of the wheel uprights 24 to the suspensions 10a, b are reduced to only one outboard bushing 42 per side, and the wheel uprights 24 are rigidly attached to the fore/aft links 21.

In the present invention, as the wheels 30 travel in jounce and rebound, the wheel uprights 24 follow a path determined by the radius of the upper control rod 33 and the lateral links 28, in combination with the bushing deflection compliances. Camber is controlled due to the positioning of the upper control rod 33 and lower control arm 21, 28, shown in the rear view (i.e., FIG. 3), and the effective length of the lower lateral links 28 relative to the axle lateral center line (refer to FIG. 4).

The present invention embodies an independent rear suspension (IRS) (see first and second half axles 16a, b), which does not have a rigid beam axle construction. The fore/aft link 21 carries a bending load from the air bag spring loads and wheel loads that are then stabilized laterally with the lateral links 28. Due to the design of the combination of the lower links 21, 28 and the upper links 33, the present invention results in significantly different kinematics than a dependent rear vehicle suspension.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A vehicle suspension, comprising:
   a fore/aft link having a first end and a second end;
   a bracket having a pivot aperture pivotally supporting the first end of the fore/aft link from a vehicle frame member;
   an air bag spring located between the second end of the fore/aft link and the vehicle frame member;
   a lateral link pivotally connected proximate the second end of the fore/aft link and a portion of the vehicle frame member; and
   a wheel upright having a half axle aperture extending therethrough above the fore/aft link, rigidly attached proximate the second end of the fore/aft link;
   wherein the air bag spring is located behind the wheel upright, thereby the distance from the bracket pivot aperture to the air bag spring is greater than the distance from the bracket pivot aperture to the half axle aperture.

2. The vehicle suspension of claim 1, further comprising an upper control rod connected between the wheel upright and the frame member.

3. The vehicle suspension of claim 1, wherein a half axle extends through the half axle aperture, the half axle communicating mechanical rotation from a rear wheel differential to at least one wheel.

4. The vehicle suspension of claim 1, wherein a maximum of five bushings are utilized to mount the vehicle suspension to the frame member and to connect the vehicle suspension to the wheel upright.

5. An independent vehicle suspension, comprising:
   a separate fore/aft link on each side of a vehicle, each fore/aft link having a first end and a second end;
   a separate bracket on each side of the vehicle, each bracket having a pivot aperture pivotally supporting the first end of the corresponding fore/aft link from a vehicle frame member;
   a separate air bag spring on each side of the vehicle, each air bag spring located between the second end of the corresponding fore/aft link and the vehicle frame member;
   a separate lateral link on each side of the vehicle, each lateral link pivotally connected proximate the second end of the corresponding fore/aft link and the vehicle frame member; and
   a separate wheel upright on each side of the vehicle, each wheel upright having a half axle aperture extending therethrough above the corresponding fore/aft link, rigidly attached proximate the second end of the corresponding fore/aft link;
   wherein each air bag spring is located behind the corresponding wheel upright, thereby the distance from each bracket pivot aperture to the corresponding air bag spring is greater than the distance from each bracket pivot aperture to the corresponding half axle aperture.

6. The independent vehicle suspension of claim 5, further comprising a separate upper control rod on each side of the vehicle, each upper control rod connected between the corresponding wheel upright and the frame member.

7. The independent vehicle suspension of claim 5, wherein a separate half axle on each side of the vehicle extends through the corresponding half axle aperture, each half axle communicating mechanical rotation from a rear wheel differential to at least one wheel on the corresponding side of the vehicle.

8. The independent vehicle suspension of claim 5, wherein a maximum of five bushings per side of the vehicle are utilized to mount the independent vehicle suspension to the frame member and to connect the independent vehicle suspension to the wheel upright.

9. A vehicle having an independent rear suspension, the independent rear suspension comprising:
- a separate fore/aft link on each side of a vehicle, each fore/aft link having a first end and a second end;
- a separate bracket on each side of the vehicle, each bracket having a pivot aperture pivotally supporting the first end of the corresponding fore/aft link, from a vehicle frame member;
- a separate air bag spring on each side of the vehicle, each air bag spring located between the second end of the corresponding fore/aft link and the vehicle frame member;
- a separate lateral link on each side of the vehicle, each lateral link pivotally connected proximate the second end of the corresponding fore/aft link and the vehicle frame member; and
- a separate wheel upright on each side of the vehicle, each wheel upright having a half axle aperture extending therethrough, above the corresponding fore/aft link, rigidly attached proximate the second end of the corresponding fore/aft link;

wherein each air bag spring is located behind the corresponding wheel upright, thereby the distance from each bracket pivot aperture to the corresponding air bag spring is greater than the distance from each bracket pivot aperture to the corresponding half axle aperture.

10. The independent rear suspension of claim 9, further comprising a separate upper control rod on each side of the vehicle, each upper control rod connected between the corresponding wheel upright and the frame member.

11. The independent rear suspension of claim 9, wherein a separate half axle on each side of the vehicle extends through the corresponding half axle aperture, each half axle communicating mechanical rotation from a rear wheel differential to at least one wheel on the corresponding side of the vehicle.

12. The independent rear suspension of claim 9, wherein a maximum of five bushings per side of the vehicle are utilized to mount the vehicle suspension to the frame and to connect the independent rear suspension to the wheel upright.

* * * * *